(12) United States Patent
Zhang et al.

(10) Patent No.: US 11,971,957 B2
(45) Date of Patent: Apr. 30, 2024

(54) AGGREGATING SENSOR PROFILES OF OBJECTS

(71) Applicant: Analog Devices International Unlimited Company, Limerick (IE)

(72) Inventors: Qian Zhang, Newton, MA (US);
Sudong Shu, Andover, MA (US);
Rajesh Mahapatra, Bangalore (IN);
Raka Singh, Bangalore (IN); Michael L. Long, Boylston, MA (US)

(73) Assignee: Analog Devices International Unlimited Company, Limerick (IE)

( * ) Notice: Subject to any disclaimer, the term of this patent is extended or adjusted under 35 U.S.C. 154(b) by 596 days.

(21) Appl. No.: 17/130,653

(22) Filed: Dec. 22, 2020

(65) Prior Publication Data

US 2022/0044064 A1 Feb. 10, 2022

(30) Foreign Application Priority Data

Aug. 8, 2020 (IN) .............................. 202041034065
Aug. 10, 2020 (IN) .............................. 202041034186

(51) Int. Cl.
*G06T 7/20* (2017.01)
*G06F 16/28* (2019.01)
(Continued)

(52) U.S. Cl.
CPC ............ *G06F 18/22* (2023.01); *G06F 16/285* (2019.01); *G06F 16/583* (2019.01); *G06V 10/62* (2022.01);
(Continued)

(58) Field of Classification Search
CPC ........ G06V 20/53; G06V 20/36; G06V 20/44; G06V 10/62; G06V 20/48; G06V 20/58;
(Continued)

(56) References Cited

U.S. PATENT DOCUMENTS 7,852,217 B2 12/2010 Kondo et al.
9,195,883 B2 11/2015 Brewer et al.
(Continued)

OTHER PUBLICATIONS

Eshel, R., Moses, Y., "Tracking in a Dense Crowd Using Multiple Cameras", International Journal of Computer Vision, published Nov. 17, 2009, 3 bib pages, and 15 pages of article. (Year: 2009).*
(Continued)

*Primary Examiner* — Brian Werner
(74) *Attorney, Agent, or Firm* — Schwegman Lundberg & Woessner, P.A.

(57) ABSTRACT

This disclosure describes techniques to aggregate sensor data. The techniques perform operations comprising: receiving, from a first sensor, a first profile representing a first set of movement attributes detected by the first sensor in an area at a given point in time; receiving, from a second sensor, a second profile representing a second set of movement attributes detected by the second sensor in the area at the given point in time; computing a similarity measure between the first and second sets of movement attributes of the first and second profiles; determining that the similarity measure exceeds a threshold value; and in response to determining that the similarity measure exceeds the threshold value, associating the first and second profiles with a same first object that is in the area at the given point in time.

20 Claims, 5 Drawing Sheets

(51) Int. Cl.
*G06F 16/583* (2019.01)
*G06F 18/22* (2023.01)
*G06V 10/62* (2022.01)
*G06V 20/40* (2022.01)
*G06V 20/52* (2022.01)
*G06V 20/58* (2022.01)

(52) U.S. Cl.
CPC .............. *G06V 20/44* (2022.01); *G06V 20/48* (2022.01); *G06V 20/52* (2022.01); *G06V 20/53* (2022.01); *G06V 20/58* (2022.01)

(58) Field of Classification Search
CPC ...... G06V 10/16; G06V 10/80–10/817; G06V 10/759
See application file for complete search history.

(56) References Cited

U.S. PATENT DOCUMENTS

| | | | |
|---|---|---|---|
| 9,922,256 | B2 | 3/2018 | Savvides et al. |
| 10,410,048 | B2 | 9/2019 | Marcheselli et al. |
| 10,432,897 | B2 | 10/2019 | Carey |
| 10,586,208 | B2 | 3/2020 | Buibas et al. |
| 10,628,714 | B2 | 4/2020 | Pradeep et al. |
| 10,691,931 | B2 | 6/2020 | Herring et al. |
| 2006/0285723 | A1* | 12/2006 | Morellas ................ G06T 7/254 382/103 |
| 2012/0026335 | A1* | 2/2012 | Brown .................... G06T 7/292 382/103 |
| 2014/0347479 | A1 | 11/2014 | Givon |
| 2015/0062336 | A1* | 3/2015 | Yoneji .................... G06V 10/96 348/143 |
| 2015/0294483 | A1 | 10/2015 | Wells et al. |
| 2015/0297949 | A1 | 10/2015 | Aman et al. |
| 2016/0092739 | A1 | 3/2016 | Oami et al. |
| 2019/0205656 | A1 | 7/2019 | Srinivasan et al. |

OTHER PUBLICATIONS

Khan et al., "Consistent Labeling of Tracked Objects in Multiple Cameras with Overlapping Fields of View", IEEE Transactions on Pattern Analysis and Machine Intelligence, vol. 25, No. 10, Oct. 2003, pp. 1355-1360. (Year: 2003).*

* cited by examiner

AGGREGATING SENSOR PROFILES OF OBJECTS

CROSS-REFERENCE TO RELATED APPLICATIONS

This application claims the benefit of priority to Indian Application No. 202041034065, filed with the India (IN) Patent Office on Aug. 8, 2020, and Indian Application No. 202041034186, filed with the India (IN) Patent Office on Aug. 10, 2020, which are incorporated herein by reference in its entirety.

FIELD OF THE DISCLOSURE

This document pertains generally, but not by way of limitation, to detecting objects using overhead cameras, and more particularly, to using multiple sensors to detect and track one or more people in a room.

BACKGROUND

People detection and counting in a room is an important task in many applications such as surveillance, building and space management, etc. Normally, the sensor is installed at the center of the room on the ceiling and looks downwards. This kind of installation limits occlusion issues but introduces various other complications when attempting to detect people.

OVERVIEW

This disclosure describes, among other things, techniques to detect an object using multiple sensors.

In some aspects, a system for detecting an object using multiple sensors includes: a processor; and a memory for storing one or more instructions that, when executed by the processor, configure the processor to perform operations comprising: receiving, from a first sensor, a first profile representing a first set of movement attributes detected by the first sensor in an area at a given point in time; receiving, from a second sensor, a second profile representing a second set of movement attributes detected by the second sensor in the area at the given point in time; computing a similarity measure between the first and second sets of movement attributes of the first and second profiles; determining that the similarity measure exceeds a threshold value; and in response to determining that the similarity measure exceeds the threshold value, associating the first and second profiles with a same first object that is in the area at the given point in time.

In some aspects, the first and second sensors comprise image sensors.

In some aspects, the operations further comprise aggregating the first profile with the second profile to generate a global profile that represents movement of the first object in the area, the global profile comprising a subset of features from the first profile and the second profile.

In some aspects, the operations further comprise computing a count value indicating how many objects are present in the area at the given point in time based on the global profile.

In some aspects, the first object is visible by both the first and second sensors.

In some aspects, the first set of movement attributes includes a time series vector comprising at least one of a timestamp, a motion vector, activity information, color distribution, luminance intensity, or one or more shape measurements comprising an area-to-perimeter ratio.

In some aspects, the time series vector further includes one or more location coordinates.

In some aspects, the similarity measure is computed in accordance with an information theoretic metric.

In some aspects, the first sensor generates the first profile by: obtaining an image of the area at the given point in time; extracting one or more features from the image of the area; and determining a location coordinate, a timestamp, a motion vector, activity information, color distribution, luminance intensity, and one or more shape measurements for one or more objects depicted in the image.

In some aspects, the operations further comprise: determining a first track representing movement of the first object in the area based on the first profile; determining a second track representing movement of the first object in the area based on the second profile; and fusing the first and second tracks to generate a third track representing movement of the first object in the area.

In some aspects, the operations further comprise: receiving, from the first sensor, a third profile representing a third set of movement attributes detected by the first sensor in the area at the given point in time; receiving, from a second sensor, a fourth profile representing a fourth set of movement attributes detected by the second sensor in the area at the given point in time; computing a plurality of similarity measures between the first, second, third and fourth profiles; and selecting the first and second profiles to be associated with the first object and selecting the third and fourth profiles to be associated with a same second object based on the plurality of similarity measures.

In some aspects, the operations further comprise estimating linear displacement or angular rotation errors based on the first and second profiles.

In some aspects, the operations further comprise: determining, at a subsequent point in time, that only a single object exists in the area that is visible to the first and second sensors; receiving updated first and second profiles representing updated sets of movement attributes within the area at the subsequent point in time from the first and second sensors; and updating the linear displacement or angular rotation errors based on the updated first and second profiles.

In some aspects, a method comprises: receiving, from a first sensor, a first profile representing a first set of movement attributes detected by the first sensor in an area at a given point in time; receiving, from a second sensor, a second profile representing a second set of movement attributes detected by the second sensor in the area at the given point in time; computing a similarity measure between the first and second sets of movement attributes of the first and second profiles; determining that the similarity measure exceeds a threshold value; and in response to determining that the similarity measure exceeds the threshold value, associating the first and second profiles with a same first object that is in the area at the given point in time.

In some aspects, the first and second sensors comprise image sensors.

In some aspects, the method includes aggregating the first profile with the second profile to generate a global profile that represents movement of the first object in the area, the global profile comprising a subset of features from the first profile and the second profile.

In some aspects, the method includes computing a count value indicating how many objects are present in the area at the given point in time based on the global profile.

In some aspects, an apparatus comprises: means for receiving, from a first sensor, a first profile representing a first set of movement attributes detected by the first sensor in an area at a given point in time; means for receiving, from a second sensor, a second profile representing a second set of movement attributes detected by the second sensor in the area at the given point in time; means for computing a similarity measure between the first and second sets of movement attributes of the first and second profiles; means for determining that the similarity measure exceeds a threshold value; and means for, in response to determining that the similarity measure exceeds the threshold value, associating the first and second profiles with a same first object that is in the area at the given point in time.

In some aspects, the method includes means for aggregating the first profile with the second profile to generate a global profile that represents movement of the first object in the area, the global profile comprising a subsets of features from the first profile and the second profile.

In some aspects, the method includes means for computing a count value indicating how many objects are present in the area at the given point in time based on the global profile.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
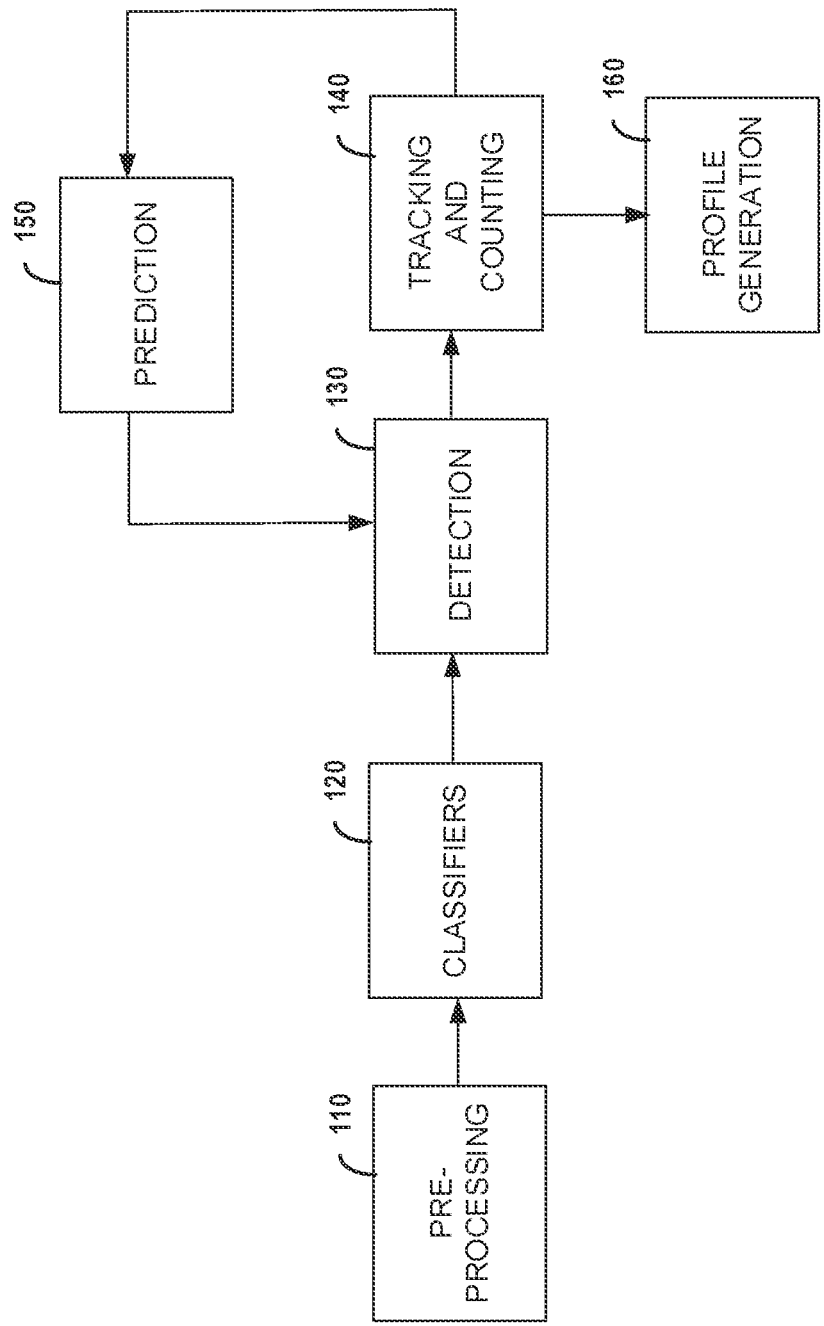
FIG. 1 is a block diagram of an example of an object detection system in accordance with various embodiments.

This disclosure describes, among other things, techniques to use multiple sensors, such as passive infrared (PLR) detectors for detecting and counting objects (such as humans) in an area, such as a conference room.

Typical systems capture images from multiple sensors and stitch the images together to count people in a room. For example, a count algorithm is run on the stitched image data to determine how many people are detected at a given location. While such systems generally work well, they fail to consider duplicate counts, such as in the case that the same object appears in more than one of the stitched images. Also, such systems oftentimes have various dead zones that miss counting people that are present but are not depicted in the images.

According to the disclosed embodiments, the disclosure describes a novel and resource efficient approach to use a cloud-based aggregator for counting objects, such as people, in an area based on information received from multiple sensors. The disclosed approach receives, from a first sensor, a first profile representing a first set of movement attributes detected by the first sensor in an area at a given point in time and receives, from a second sensor, a second profile representing a second set of movement attributes detected by the second sensor in the area at the given point in time. The disclosed approach computes a similarity measure between the first and second sets of movement attributes of the first and second profiles, and in response to determining that the similarity measure exceeds a threshold value, the disclosed approach associates the first and second profiles with a same first object that is in the area at the given point in time.

This approach preserves privacy of detected objects and still allows the cloud-based aggregator to perform various operations, such as counting people or objects and classifying human behavior. In one example, the disclosed approach aggregates the first and second profiles to generate a global profile of an object or person that is detected at the given point in time in the area. The global profile is used to count the number of objects in an area, characterize behavior of objects in the area, and/or track movement of the objects in the area.

In some embodiments, the profile received from each sensor includes a time series of vectors. Each vector can include: time stamp; one or more location coordinates; a motion vector; activity information; color distribution; luminance intensity; and a set of shape measurements such as area-to-perimeter ratio. In one example, each sensor uses an algorithm to calculate a vector, using a sequence of real-time images. These images, when played as a video, capture the motion of the person. Specifically, the sensor extracts one or more features from an image of the area that the sensor captures and determines a location coordinate, a timestamp, a motion vector, activity information, color distribution, luminance intensity, and one or more shape measurements for one or more objects depicted in the image. These features are collected into a set of movement attributes that are included in a profile that the sensor provides to the cloud-based aggregator. In one example, the profile is generated and provided to the cloud-based aggregator on a continuous basis. In another example, the profile is generated and provided to the cloud-based aggregator on a periodic basis. In another example, the profile is generated and provided to the cloud-based aggregator in response to detecting one or more changes by a sensor in an image captured by the sensor relative to prior images captured by the sensor.

The disclosure describes a connected system of multiple image capturing and processing units and a central processing unit that senses the presence, location, motion, orientation, action type and level of humans or objects over time in an area. The system outputs analytics such as count of the number of objects in the area over time, inter-person distance, social behavior, and utilization of resources, such as work stations, meeting rooms and huddle areas. The system also outputs tracking status of the objects in the form of a heat map of object (human) motion over time and can output a safety alarm when an object becomes motionless for a long time. The system provides a mechanism for opting out of analysis for privacy protection.

In the age of digital transformation, digitizing human activity remains an unsolved problem for many organizations. For example, an organization is generally interested in understanding its members' activity in office. This disclosure describes a real-time system of sensors and processing units that digitizes human activity in an area by generating a profile for each object in the area and supplies useful analytics, for example office space utilization over time. The system includes multiple sensors and a central processing unit that are interconnected, via wireless network such as ZigBee, WiFi, LoRa, NBIOT and BlueTooth, or via wired network such as Ethernet. The system covers an entire area and each sensor covers a certain portion or region of the entire area.

In some embodiments, each sensor includes an image capturing device, a processor and a memory device. An application on a mobile device is used to define several zones in the field of view of each sensor. The sensor captures a sequence of images in time domain, and then executes an algorithm in the processor on each zone to analyze the captured images to detect the presence of an object (e.g., a human) and measure his/her location, motion, and orientation over time. The algorithm also classifies the object action and measures the amount of such action over time. This information is collected into a profile for each individual object or person in the area. The sensors transmit the profiles of the people in their respective region to a central processing unit. To protect privacy, a person can opt-out of the coverage by the sensor. The person performs a predefined pattern of actions that the sensor can recognize and subsequently stop transmitting his/her profile.

The central processing unit can be local to the area or reside in the cloud. The central processing unit combines or aggregates the profiles from the sensors to create a global profile of all the people in the entire area. The central processing unit uses the location and motion information of the profiles from neighboring sensors to identify a person that is detected by both sensors and subsequently avoid counting this person more than once. For example, the central processing unit (referred to as the cloud-based aggregator) can receive multiple profiles from many different sensors. The cloud-based aggregator computes similarity measures between all or a subset of the profiles, such as by performing image registration techniques. If the cloud-based aggregator determines that two or more profiles (e.g., respective sets of movement attributes of the profiles) have a similarity measure that exceeds a specified threshold value, the cloud-based aggregator can associate the two or more profiles with a same person or object that is in the area at the specified time. The could-based aggregator can then combine or aggregate the movement attributes from each of the profiles of the two or more sensors to generate a global profile for the particular person or object that is in the area. As an example, the cloud-based aggregator can compute a track representing movement of the object in the area by fusing respective tracks representing movement that is included in the two or more profiles. As another example, the cloud-based aggregator can estimate linear displacement or angular rotation errors based on the two or more profiles received from the two or more sensors.

In some embodiments, the central processing unit can supply a variant of useful analytics. It can profile the number of people in the area or any portion of the area over a time period. This information reflects the utilization of the associated space resource over time, for example work station, conference room and huddle area. The central processing unit can provide the traces of the people, for example in the form of a heat map to reflect the utilization of the associated space.

In some embodiments, the central processing unit can measure the distance between any two or more objects over a time period, as a measure of social distance. The central processing unit can detect a group by connecting persons whose distance is shorter than a threshold. The central processing unit can then measure the time and the occupied space of this group as a quantitative measure of social behavior, e.g. collaboration. The central processing unit can detect a solo person whose distance from everyone else is larger than a threshold. The central processing unit can then measure the time and the occupied space of this person as a quantitative measure of another social behavior, e.g. focus. The central processing unit can detect a motionless person whose motion information remains unchanged over a threshold time period. This result can be used to trigger an alarm as the person could be in unfavorable condition.

In general, the central processing unit can correlate any set of (space, time) points for the area using any data in the profiles. For example, one can find out the correlation between the usage of a conference room and the usage of its neighboring coffee station. The system is real-time as the sensors capture images fast enough to capture human action and generate profiles of respective objects. The sensors transmit the profiles to the central processing unit in a configurable frequency. The frequency can be as high as once every few seconds to enable the system to respond to a human action in real time, or arbitrarily low to reduce network bandwidth utilization.

FIG. 1 is a block diagram of an example of an object detection system 100 in accordance with various embodiments. The object detection system 100 includes a pre-processing block 110, one or more classifiers 120, a detection block 130, a tracking and counting block 140, a prediction block 150, and a profile generation block 160.

Any component of the object detection system 100 or all of the components can be respectively implemented by different sensors in an area. For example, a first sensor can implement the pre-processing block 110, the one or more classifiers 120, the detection block 130, the profile generation block 160, the tracking and counting block 140, and the prediction block 150 to generate profiles for objects that, the first sensor detects. The first sensor can then transmit the generated profiles to a cloud-based aggregator which may implement some or all of the functionality of the object detection system 100. A second sensor can implement another instance of the pre-processing block 110, the one or more classifiers 120, the profile generation block 160, the detection block 130, the tracking and counting block 140, and the prediction block 150 to generate profiles for objects that the second sensor detects. The second sensor can then transmit the generated profiles to the cloud-based aggregator. The cloud-based aggregator can aggregate or fuse together the profiles it receives from the first and second sensors using the profile generation block 160 (implemented by the cloud-based aggregator) to create a global profile for the area or an object in the area. In some cases, the cloud-based aggregator fuses the profiles received from the first and second sensors into a single profile for an object for an area in which both sensors detect the same object and hence provide a set of movement attributes that have similarity measures that exceed a threshold value.

The object detection system 100 may count the number of people and their locations from a centrally mounted ceiling overhead sensor, such as a PIR sensor or image sensor. In some cases, the object detection system 100 is configured to count and track human people as objects. In some other cases, the object detection system 100 is configured to count and track vehicles as objects. In such cases, the object detection system 100 may be mounted overhead on a street sign above one or more car lanes. While the disclosed system is discussed with respect to tracking and counting human objects, the disclosed system can be applied to count and track any other type of object (cars, boats, planes, animals, and so forth).

Images captured by overhead cameras (that may or may not use fisheye lenses) are free from occlusion but also suffer from the problem that key features such as face, foot, hands of objects etc. are missing or cannot be seen. Also, relying only on motion features of the objects for detection and counting may not be reliable due to noise/light changes that may be interpreted as motion and incorrectly included in the counting/tracking. Also, multiple people in close proximity may not be detected separately and detecting and tracking people who make little motion may also be challenging.

The object detection system 100 receives at the pre-processing block 110 one or more images from an overhead sensor or camera, such as a fisheye lens. The one or more images may include multiple features, such as foreground, edges, motion, and occlusion features. The pre-processing block 110 extracts the features from the images. A first pre-processing engine in the pre-processing block 110 extracts motion features and occlusion features from the images. Occlusion features are defined as pixel-level features where occluding foreground pixels are extracted. A second pre-processing engine in the pre-processing block 110 extracts foreground pixels using a Mixture of Gaussian (MOG) algoiithin and augments the foreground pixels with edge foreground pixels.

For example, the first pre-processing engine computes the motion map from consecutive frames received from the overhead sensor and generates a contrast change map to identify the areas of positive contrast change and negative contrast changes. The first pre-processing engine may use a passive infrared sensor (PIR) signal during changing lights to figure out the actual motion. The first pre-processing engine computes the occlusion map (or people in foreground) based on these contrast changes and forms occlusion (foreground) entities by segmenting the occlusion map. With help of motion map segmentation along with the occlusion entities, occupancy count entities are formed. These entities represent potential people or objects. The life of these occupancy count entities depends on motion in subsequent frames.

The second pre-processing engine runs the MOG model for background and foreground (BG/FG) classification or BG/FG map. Modelling the background and foreground avoids learning people sitting in the room as background. This can be achieved with a selective learning of the background, with masks around people such that they are not learnt as background. The output of the pre-processing block 110 produces an image in which different regions are identified as regions-of-interest that may or may not include a target object (e.g., a human or vehicle). For example, squares or other shapes of different sizes can be added by the pre-processing block 110 to the captured image to identify regions that may contain an object to be counted and/or tracked. In some embodiments, the output of the pre-processing block 110 is provided to HOG classifiers 120 to detect the presence of objects in the identified regions, such as based on a position and orientation of the regions relative to the overhead camera or sensor.

In some embodiments, the occupancy count entities go through a filter where the camera geometry (human calibrated models) is used to find a modelled shape of a person in an image at a given point. The overlap of the shape of a person with an occupancy count entity is done on the BG/FG map. It the shape criteria matches the requirements, these occupancy count entities are added as new tracked objects.

In each and every iteration, tracked objects are matched with occupancy count entities in the tracking and counting block 140. In some embodiments, HOG classifiers that are trained on overhead people are run in the spatial vicinity of the tracked objects. These HOG classifiers are used to boost confidence of the detections. There is a feedback mechanism where a tracked object with HOG classifier increases the life of its corresponding occupancy entity.

In a post-processing engine (the detection block 130), some of the tracked objects (output by the classifiers 120) are not counted based on their history of motion, BG/FG pixels, and/or number of classifier detection patterns. Specifically, the post-processing engine uses features from the second pre-processing engine of the pre-processing block 110 to extract, at a lower image resolution, a confidence map and motion map. The confidence map shows the confidence probability of each pixel being a person. The motion map shows the regions where there are motion features.

The post-processing engine, such as the detection block 130, computes motion regions at two different resolution of motion features, 320×240 and 80×60, to get low-resolution motion blobs and high-resolution motion blobs. High-resolution motion blobs detect people farther away from the center, because of the increased granularity at high resolution. The output of the post-processing engine feeding into a tracking and counting block 140, which associates over time uniquely identified motion regions. These motion regions or blobs are detected as potential people. These motion regions are fed back into a tracking module which tracks people. In this way, people who stop moving are still detected without motion features. The tracking and counting block 140 also does a prediction using the prediction block 150 of location for the subsequent frame, which is fed back into the detection block 130. This allows the detection block 130 to remove false positives or identify false negatives in subsequent frames of a video.

In some embodiments, the output of tracking is fed into a classifier based on HOG-SVM, which detects people based on HOG features which are pre-trained to create the SVM model. The classifier model increases the confidence of the tracked areas as people. Hence, areas with no motion can still be detected as people, and areas with motion like shadows etc., can be rejected as people. The extracted features such as motion, confidence, foreground, classifier detections are used together in the post-processing engine (detection block 130) to remove false positives and false negatives, and count the people.

In some embodiments, the object detection system 100 (implemented by a cloud-based aggregator) is configured to characterize human behavior from the information received from the PIR sensors in an area. In such cases, the object detection system 100 performs high-accuracy aggregation of person profiles from multiple sensors using the profile generation block 160.

In such cases, each sensor creates a profile for every person in its field of view using a profile generation block 160 implemented by the respective sensor of a collection of sensors. The profile can include a time series of elements representing movement attributes that include: location coordinates of detected objects, motion, trace, activity measure and type or characterization, and a set of descriptors of the object which may include color composition, luminance intensity and shape information. The elements correspond to a time series of images that are captured in real-time, which means the images carry the motion information of the person. The sensor executes an algorithm to compute each element using its corresponding image. Each sensor sends the profiles of all the objects in its field of view to an aggregation device (such as a cloud-based aggregator).

For example, a first sensor in an area can capture one or more images of objects in the area that are within its field of view. The first sensor implements a profile generation block 160 that enables the first sensor to generate a profile representing the objects in the area within the field of view of the first sensor. In one example, the first sensor extracts one or more features from the image of the area and determines a location coordinate, a timestamp, a motion vector, activity information, color distribution, luminance intensity, and one or more shape measurements for one or more objects depicted in the image. The first sensor collects these features into a set of movement attributes and includes such movement attributes in a first profile. In some cases, a set of movement attributes, when defined or received for multiple images that the first sensor captures, define a movement track of a given object.

A second sensor in an area can capture one or more images of objects in the area that are within its field of view. The second sensor implements a profile generation block 160 that enables the second sensor to generate a profile representing the objects in the area within the field of view of the second sensor. In one example, the second sensor extracts one or more features from the image of the area and determines a location coordinate, a timestamp, a motion vector, activity information, color distribution, luminance intensity, and one or more shape measurements for one or more objects depicted in the image. The second sensor collects these features into a set of movement attributes and includes such movement attributes in a second profile. In some cases, a set of movement attributes, when defined or received for multiple images that the second sensor captures, define a movement track of a given object.

A cloud-based aggregator receives the first and second profiles from the first and second sensors and identifies a same object in the area that is associated with the first and second profiles. For example, the first sensor may provide a first profile for a given object for which the second sensor also provides a profile. The cloud-based aggregator determines that the two profiles correspond to the same given object when a set of movement attributes of the two profiles have a similarity measure that exceeds a threshold. In such cases, the cloud-based aggregator fuses information from the two profiles to generate a global profile for the given object. In the case of a single object in an area, the receipt of two different profiles from two different sensors is trivial to determine that the two profiles correspond to the same object. However, if two objects exist in an area and four profiles are received from two sensors (e.g., two profiles for each of the two objects detected by the first sensor and two profiles for the same two objects detected by the second sensor), determining which profiles correspond to which objects becomes non-trivial. In such cases, the cloud-based aggregator, using a similarity measure of the four different profiles, can assign and select a first pair of profiles that correspond to the first of the two objects (e.g., one profile from the first sensor and one from the second sensor) and select a second pair of profiles that correspond to the second of the two objects (e.g., another profile from the first sensor and another from the second sensor).

Certain systems use a single image (thus one time measurement) and only location information to detect objects without motion information due to one-time measurement. Thus, such systems are subject to errors of miscounting or double counting a person. The disclosed approach uses multiple images, a much richer set of information, including motion information due to real-time measurement. This can significantly reduce the errors of miscounting and double counting persons.

Figure 2:
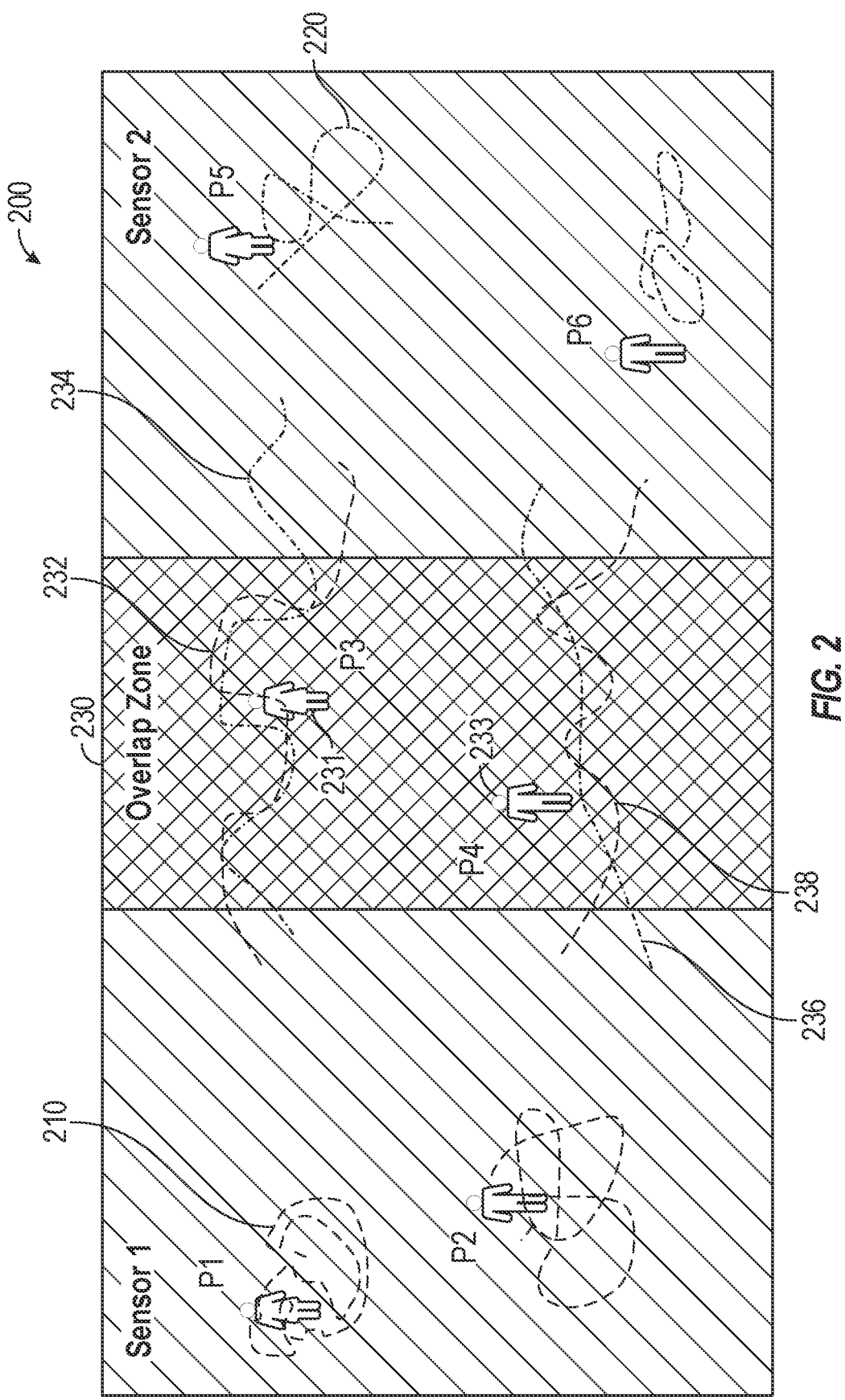
FIG. 2 is an example of multiple profiles received from multiple sensors in accordance with various embodiments.

FIG. 2 is an example of an area 200 in which multiple profiles are received from multiple sensors in accordance with various embodiments. As shown, the field of view of a first sensor (e.g., sensor 1) includes an area that includes four objects (P1, P2, P3 and P4). In this case, sensor 1 computes a profile that provides a set of movement attributes of each of the four objects. The set of movement attributes can define a movement track 210 of a first object P1, as an example. The set of movement attributes can also define a movement track 232 of a third object 231 (P3), as an example, that is also within a field of view of a second sensor. Namely, the third object 231 is in an overlap zone 230 which is in the field of view of both the first and second sensors. Any image captured by the first sensor includes a portion defined by the overlap zone 230 that is also within an image captured by the second sensor. This results in both the first and second sensors generating profiles for the same set of objects that appear in the overlap zone 230.

Specifically, as shown, the field of view of a second sensor (e.g., sensor 2) includes an area that includes four objects (P3, P4, P5 and P6). In this case, sensor 2 computes a profile that provides a set of movement attributes of each of these four objects. The set of movement attributes can define a movement track 220 of a fifth object P5, as an example. The set of movement attributes can also define a movement track 234 of the third object 231 (P3), as an example, that is also within a field of view of sensor 1. Namely, the first and second sensors provide respective profiles for the same third object 231.

In addition, the first sensor also provides a profile that includes a set of movement attributes that define a movement track 238 of a fourth object 233 (P4) that is also within a field of view of the second sensor. As such, the second sensor also provides a profile that includes a set of movement attributes that define a movement track 236 of the fourth object 233 (P4). In total the first sensor provides four profiles to the cloud-based aggregator (e.g., one for each object P1, P2, P3, and P4) and the second sensor provides four profiles to the cloud-based aggregator (e.g., one for each object P3, P4, P5, and P6).

The cloud-based aggregator can compute similarity values for the set of movement attributes in all of the eight profiles it receives from the two sensors. In performing the similarity value computation, the cloud-based aggregator can determine that the coordinates provided by the profiles for objects P1 and P2 exceed a distance threshold from the coordinates provided by the profiles for objects P5 and P6. In this case, the cloud-based aggregator associates the profiles with the coordinates that exceed the distance threshold with the respective objects P1, P2, P5 and P6.

In some cases, for objects P3 and P4 that are in the overlap zone 230, the distance threshold between the coordinates provided by the profiles from the two sensors may not exceed a threshold value. Namely, the cloud-based aggregator can determine that four profiles were received from the two sensors which have less than a threshold amount of distance or that the four profiles include coordinates that fall within the overlap zone 230. Since four profiles were received, the cloud-based aggregator determines that there exist two objects in the overlap zone 230. In such cases, the cloud-based aggregator performs further similarity computations between the four profiles to determine which profiles correspond to which of the two objects (P3 and P4) in the overlap zone 230.

In some embodiments, when a person is in the overlapping zone between two adjacent sensors, the aggregation device executes an algorithm to associate the correct profiles for this person from the two aforementioned sensors. The algorithm computes a score of similarity between every pair of profiles from the two aforementioned sensors. A probability model of these data is used to compute a similarity measure using an information theoretic metric. An information theoretic metric measures the difference between two probability functions. For example, Bhattacharyya distance and Kullback-Leibler distance are example measures of difference between two probability functions. This similarity measure is used to enhance the accuracy of the track (profile) association technique. The algorithm then chooses the pair of profiles with the highest score and associates it with the person. The algorithm updates the score whenever the aggregation device receives updates to the pair of profiles from the two aforementioned sensors. In one example, the color distribution in a profile is used as a probability function to score the similarity between the pair of profiles. For example, if the color distribution between two images received from two sensors is within a certain threshold, then the probability that the two images correspond to the same person is increased.

For example, one or more persons (P3) may be within a field of view of two sensors (sensor 1 and sensor 2). Each sensor may generate a profile representing movement of the person along a track (e.g., in different colors). A track is defined by a set of movement attributes included in a profile that represent movement of a given object over time. When two objects are detected, the object detection system 100 of the cloud-based aggregator receives four tracks (four profiles with four different sets of movement attributes) in the overlap zone 230 (two red tracks 232 and 238, one for each object from sensor 1, and two blue tracks 234 and 236, one for each object in the overlap zone 230 from sensor 2).

The object detection system 100 selects in the overlap zone 230 a red track 232 and a blue track 234 for a given object 231 and uses a track association and fusion algorithm to select the best pair of red and blue tracks 232 and 234 for the object in the overlap zone 230. Similarly, the object detection system 100 selects in the overlap zone 230 a red track 238 and a blue track 236 for another object 233 and uses a track association and fusion algorithm to select the best pair of red and blue tracks 236 and 238 for the object in the overlap zone 230. The object detection system 100 uses data from the profile including time stamp, location coordinates and motion vector to perform these selection. Specifically, the object detection system 100 determines that the red track 232 and a blue track 234 received for the same given object 231 have sets of movement attributes that exceed a similarity measure and that the red track 238 and the blue track 236 for the other object 233 have sets of movement attributes that exceed the similarity measure. Namely, the blue track 236 includes a set of movement attributes that are dissimilar to the movement attributes of the red track 232 and is therefore determined to not satisfy a similarity measure to be paired with the red track 232. However, the blue track 236 includes a set of movement attributes that are similar to the movement attributes of the red track 238 and is therefore determined to satisfy a similarity measure to be paired with the red track 238. In one example, the similarity measure is based on distance (e.g., how close together the two tracks are to each other) but other criteria can be used.

Figure 3:
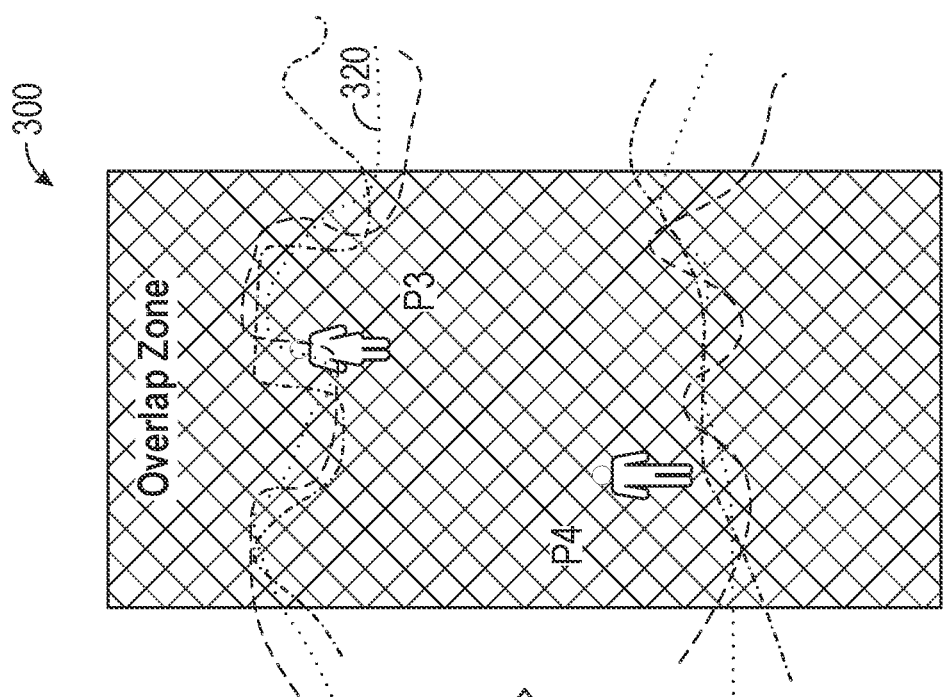
FIG. 3 is a block diagram of performing profile aggregation in accordance with various embodiments.
Figure 3:
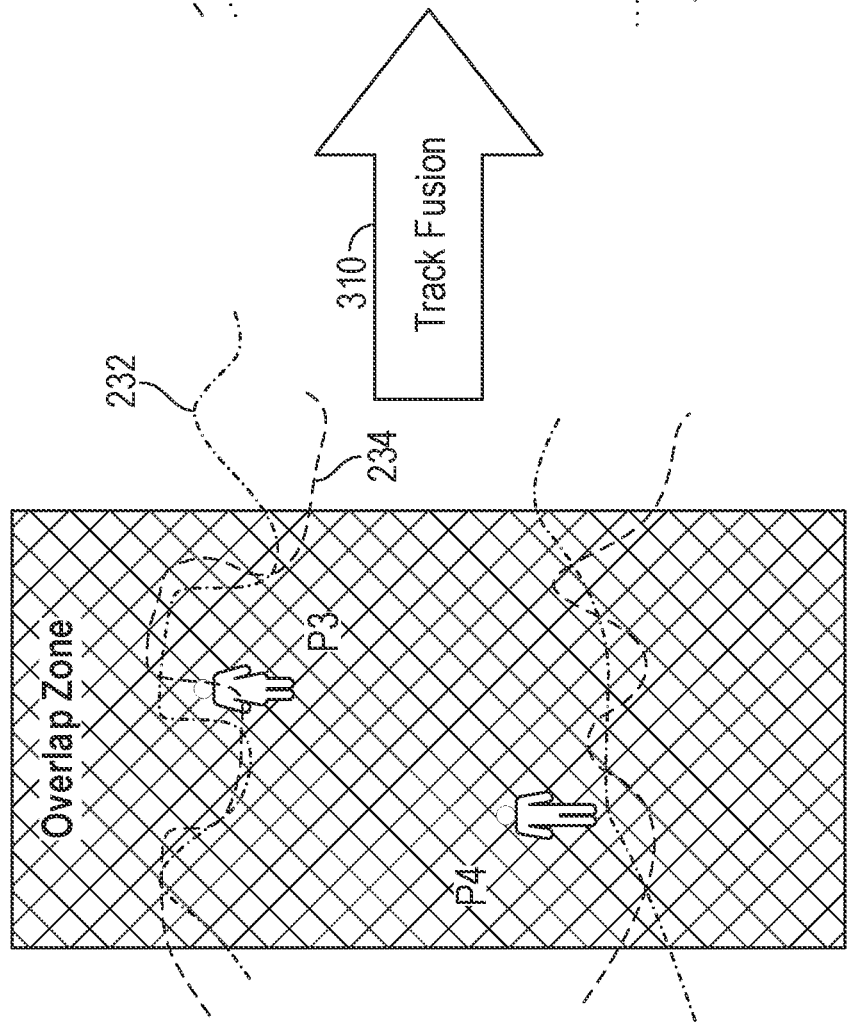

FIG. 3 is a block diagram of performing profile aggregation in accordance with various embodiments. Specifically, when the cloud-based aggregator determines that two or more profiles are associated with a same object (e.g., person), the cloud-based aggregator fuses or aggregates their sets of movement attributes (e.g., their respective movement tracks) into a global or aggregated profile (e.g., into an aggregated movement track).

For example, the object detection system 100 associates and fuses the two tracks 232 and 234 for the object P3 using a fusion process 310 similar to image registration techniques. In one example, the fusion process uses an asynchronous Kalman filter to fuse the output of two sensors. The object detection system 100 uses features extracted from images which greatly reduces the bandwidth and processing needs. The object detection system 100 uses another technique to associate the profile data, such as activity, color distribution, luminance intensity, and a set of shape measurements, such as area-to-perimeter ratio to mark persons.

The object detection system 100 (e.g., the cloud-based aggregation device) executes an algorithm to combine the elements of the pair of profiles to create a global profile for the object. The algorithm essentially hands over a person from one sensor to the other, through their fields of view. The global profile for the object includes a time stamp, location coordinates, and motion vector among any other sets of movement attributes that are included in the profiles received from the multiple sensors that are associated with the same object. In some cases, the global profile includes one set of movement attributes from the first profile (e.g., corresponding to track 232) and another different set of movement attributes from the second profile (e.g., corresponding to track 234). For example, the object detection system 100 fuses the blue and red tracks 232 and 234 that are received from the two sensors to generate an aggregate green track 320 (e.g., representing a global profile for the object). The object detection system 100 uses activity, color distribution, luminance intensity, and a set of shape measurements, such as area-to-perimeter ratio to estimate new data for the global profile. In some embodiments, the object detection system 100 computes a weighted average of the features or movement attributes included in each of the first and second profiles to generate the global profile (e.g., to generate the green track 320).

Certain systems require an accurately-defined overlapping area between the field of view of two adjacent sensors be established. The aggregation process of the disclosed approach only requires a loosely-defined overlapping area between the field of view of two adjacent sensors, thus making the installation process simpler and significantly reducing of the cost of building and expanding a network of sensors. The disclosed approach can tolerate misalignment of the field of view of the sensors which makes the installation process simpler and significantly reduces of the cost of building and expanding a network of sensors. In some embodiments, the cloud-based aggregator executes an algorithm to compute the misalignment of the field of view of the two sensors. In such circumstances, the algorithm then adjusts the global profile to negate the impact of this misalignment.

For example, the location and motion vector in a profile for each person may contain two types of alignment errors: linear displacement due to a sensor not placed precisely on a grid; and angular rotation due to a sensor's rectangular pixel array not aligned to the orientation of the grid. Because these errors are fixed, or change slowly over time, they can be estimated. In particular, when there is only one object in the overlap zone 230, the object detection system 100 receives just one profile from the first sensor (sensor 1) (e.g., just red track 232) and one profile from the second sensor (sensor 2) (e.g., just blue track 234) for an object in the overlap zone 230. In such circumstances, the cloud-based aggregator can associate the tracks and profiles received from the multiple sensors with an object with high confidence. In this case, the object detection system 100 computes the maximum likelihood estimate of the displacement and rotation errors of both tracks. Namely, the cloud-based aggregator can estimate the displacement error and/or the rotation error by comparing similarities and differences between the profiles received from the two sensors for the same object that is in the overlap zone 230.

Maximum likelihood estimation can include a method of estimating the parameter of a probability distribution function. In one example, the parameters are the linear displacement and the angular rotation between two sensors. These parameters are estimated when there is only one object in the overlap zone. It is assumed that (1) the object moves in a straight line and (2) location measurement (e.g., the X, Y coordinates) of the object in the two tracks (from the two sensors) are subject to Gaussian noise. Under these assumptions, the maximum likelihood estimate is essentially the best-fit straight line of the location measurement, which minimizes the distances (e.g., the errors) of the location measures to this straight line.

In some embodiments, each time that the cloud-based aggregator determines that only a single object exists in the overlap zone 230, the cloud-based aggregator computes an update to the estimated displacement error and/or the rotation error. For example, the cloud-based aggregator may receive at a first point in time, first and second profiles respectively from first and second sensors. The cloud-based aggregator can determine that the coordinates specified in the first and second profiles correspond to the overlap zone 230. If the cloud-based aggregator does not receive any more profiles from any other sensor that corresponds to the overlap zone 230, the cloud-based aggregator computes an estimate of the displacement error and/or the rotation error by comparing similarities and differences between the first and second profiles received from the two sensors for the same object that is in the overlap zone 230. At a second point in time subsequent to the first point in time, the cloud-based aggregator may receive third and fourth profiles respectively from first and second sensors. The cloud-based aggregator can determine that the coordinates specified in the first and second profiles correspond to the overlap zone 230. If the cloud-based aggregator does not receive any more profiles from any other sensor that corresponds to the overlap zone 230 at the second point in time, the cloud-based aggregator computes an update to the previously computed estimate of the displacement error and/or the rotation error by comparing similarities and differences between the third and fourth profiles received from the two sensors for the same object that is in the overlap zone 230.

In some embodiments, the object detection system 100 is configured to characterize human behavior from the information received from the PIR sensors in an area. In such cases, the object detection system 100 performs an alarm for social-distancing.

In such cases, the object detection system 100 computes the distance between every pair of persons based on their corresponding profiles. The object detection system 100 then applies a rule of social-distancing: if a distance is shorter than a threshold, and stays so for longer than a timer threshold, then the rule of social-distancing is declared violated. The aggregation then sends an alarm signal: for example sounding an alarm, flashing a light, playing a voice message, showing a message on a display device of an operator of one or both of the users who are violating social distancing. Different threshold values can be used to allow collaboration but disallow social-distancing violation. For example, in a medical operation room, the object detection system 100 can use a very small threshold for social-distancing violation (so small to effectively disable the rule) and a somewhat larger threshold for collaboration.

In some cases, the object detection system 100 performs a measure of collaboration. Specifically, the object detection system 100 computes the distance between every pair of persons. The object detection system 100 then applies a rule of collaboration: if a distance is shorter than a threshold, and stays so for longer than a timer threshold, then the rule of collaboration is declared satisfied. The object detection system 100 can create collaboration groups. Each group includes the persons who are connected via "collaboration". In other words, each group is a connected topological network. The object detection system 100 then sends a report about the collaboration groups, the area they use and the time duration of collaboration.

In some cases, the object detection system 100 generates an alarm for motionless people. The object detection system 100 applies a rule of motionlessness: if the motion and activity of a person is shorter than a threshold, and stay so for longer than a timer threshold, then the rule of motionlessness is declared satisfied. The aggregation device then sends an alarm about this person.

In some cases, the object detection system 100 characterizes different activities. Specifically, the sensors can detect additional types of objects: computer, desk, chair, monitor screen, black/white board, easel in addition to human objects. The sensors then send the location information of these objects to the object detection system 100. The object detection system 100 then measures the distance between these objects and a person. The object detection system 100 then applies a rule of association: if the distance between an object and a person is shorter than a threshold, and stays so for longer than a timer threshold, then the object is declared associated with the person. The object detection system 100 then applies a rule of classification: if a person is associated with a prescribed subset of objectives for longer than a timer threshold, the person is declared working. The object detection system 100 then sends a report about this person.

Other types of activities can be characterized including: single person close to PC/monitor screen+fine movement, then the activity is working or focusing; single person close to PC/monitor screen+multiple person at the entrance (to room or cubicle): the activity represents collaboration; multiple persons+a person close to a whiteboard or a large screen TV, the activity is a presentation; multiple persons close to a whiteboard, the activity is a type of intense collaboration, design or brainstorm; multiple persons around a large table, the activity is a meeting, discussion; multiple persons quasi-stationary in an area+other people transverse, the activity is a demonstration; multiple persons walking together along a path: the activity is some kind of loose collaboration during a break from work; and multiple persons quasi-stationary in an area, the activity is a social event.

In some implementations, each sensor can determine a particular activity for a given detected object and can include the type of activity among the set of movement attributes that are included in the profile generated by the sensor. When computing similarities and differences in profiles received from multiple sensors, the cloud-based aggregator can consider whether the same activity type is included in the profiles received from the multiple sensors. If the same activity type is included in multiple profiles and the locations specified in the multiple profiles are within a threshold distance of each other and correspond to the overlap zone 230, the cloud-based aggregator can associate the multiple profiles with the same object. In this case, the cloud-based aggregator can fuse their information to generate a global profile for the object.

In some cases, the object detection system 100 can be instructed by one or more users to opt-out of being detected and monitored for human activity. Specifically, a person can elect to be excluded from the analysis by sending a request to the object detection system 100. The object detection system 100 then transmits this request to the corresponding sensor. The sensor notifies the person that an opt-out process is about to start, by flashing a light or playing a sound. The person then performs a prescribed sequence of motions or gestures, physically waving their hands in a predetermined manner. The sensor then analyzes the motion of every person in the field and compares to the prescribed sequence of motion. If the sensor finds a match, it tags the person as opt-out. The sensor then sets the opt-out field of the profile of the person. The object detection system 100, upon receiving the profile of the person with the opt-out field set, begins to exclude this person in all subsequent analysis (e.g., does not consider this person for counting, social-distancing, collaboration, or characterization of activity).

Figure 4:
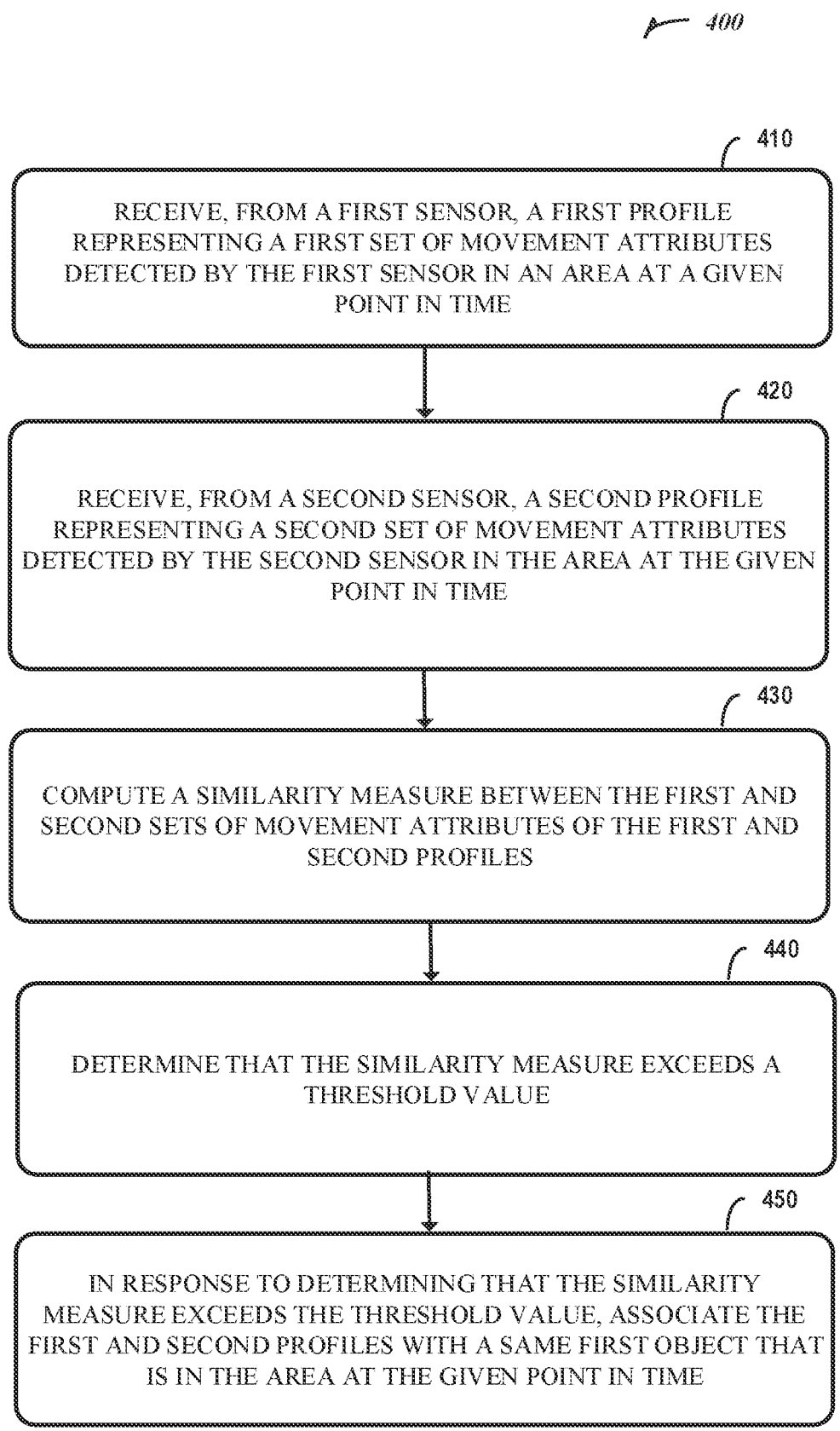
FIG. 4 is a flow diagram depicting an example process for associating profiles with objects in accordance with various embodiments.

FIG. 4 is a flow diagram depicting example process 400 for detecting an object in an image captured by an overhead camera in accordance with various embodiments. The operations of the process 400 may be performed in parallel or in a different sequence, or may be entirely omitted. In some embodiments, some or all of the operations of the process 400 may be embodied on a computer-readable medium and executed by one or more processors.

At operation 410, the object detection system 100 receives, from a first sensor, a first profile representing a first set of movement attributes detected by the first sensor in an area at a given point in time.

At operation 420, the object detection system 100 receives, from a second sensor, a second profile representing a second set of movement attributes detected by the second sensor in the area at the given point in time.

At operation 430, the object detection system 100 computes a similarity measure between the first and second sets of movement attributes of the first and second profiles.

At operation 440, the object detection system 100 determines that the similarity measure exceeds a threshold value.

At operation 450, the object detection system 100, in response to determining that the similarity measure exceeds the threshold value, associates the first and second profiles with a same first object that is in the area at the given point in time.

Figure 5:
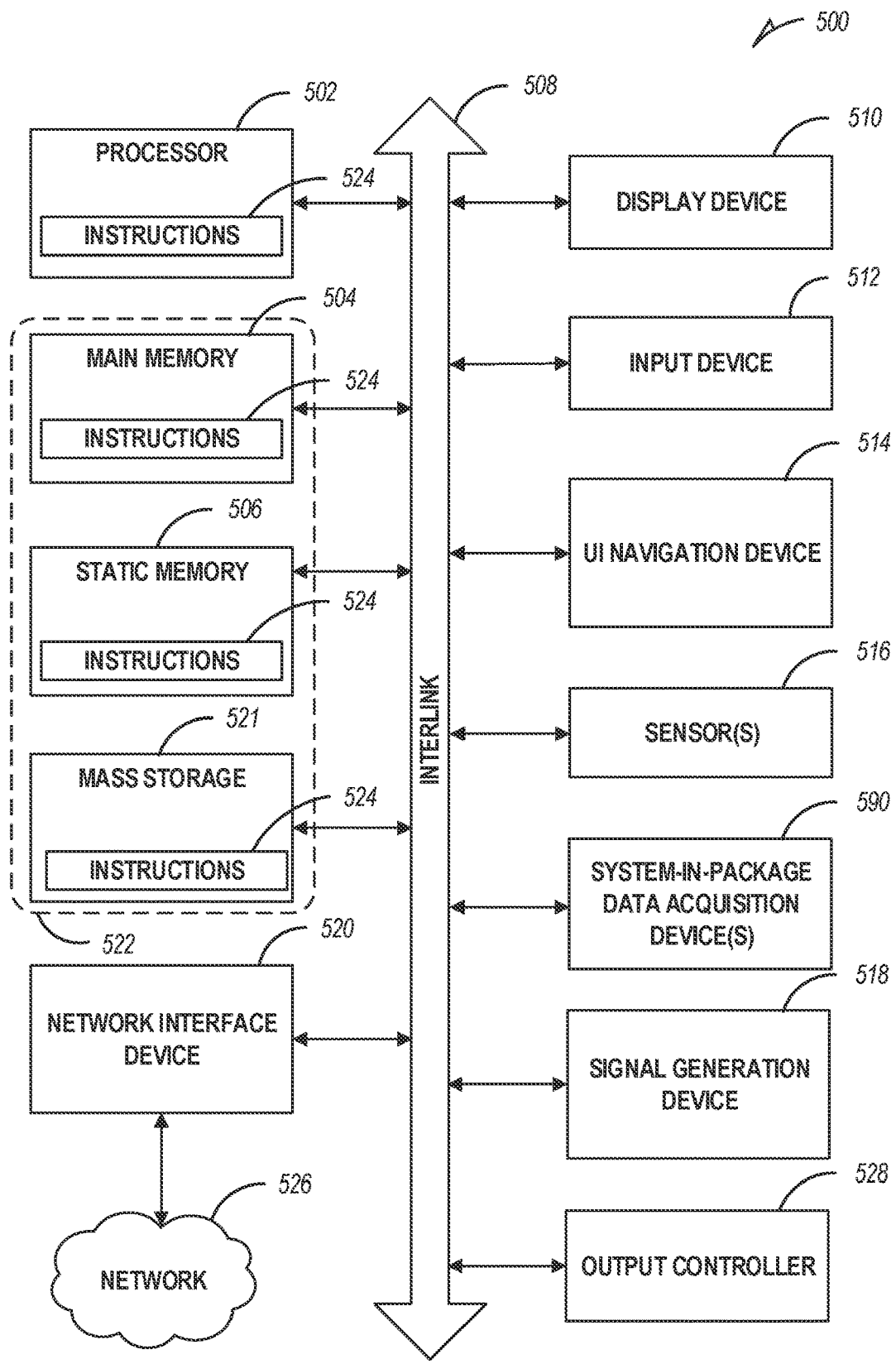
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The system-in-package data acquisition device(s) 590 may implement some or all of the functionality of the object detection system 100. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 521 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended; that is, a system, device, article, composition, formulation, or process that includes elements in addition to those listed after such a term in a aspect are still deemed to fall within the scope of that aspect. Moreover, in the following aspects, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above detailed description, various features may be grouped together to streamline the disclosure. This should not be interpreted as intending that an unaspected disclosed feature is essential to any aspect. Rather, inventive subject matter may lie in less than all features of a particular disclosed embodiment. Thus, the following aspects are hereby incorporated into the detailed description as examples or embodiments, with each aspect standing on its own as a separate embodiment, and it is contemplated that such embodiments may be combined with each other in various combinations or permutations. The scope of the inventive subject matter should be determined with reference to the appended aspects, along with the full scope of equivalents to which such aspects are entitled.

The invention claimed is:

1. A system for detecting an object using multiple sensors, the system comprising:
   at least one processor; and
   a memory for storing one or more instructions that, when executed by the at least one processor, configure the at least one processor to perform operations comprising:
   receiving, from a first sensor, a first profile representing a first set of movement attributes detected by the first sensor in an area at a given point in time;
   receiving, from a second sensor, a second profile representing a second set of movement attributes detected by the second sensor in the area at the given point in time, the first sensor having a first field of view that overlaps a second field of view of the second sensor such that the second sensor detects the second set of movement attributes at a same point in time as the first set of movement attributes are detected by the first sensor;
   computing a similarity measure between the first and second sets of movement attributes of the first and second profiles;
   determining that the similarity measure exceeds a threshold value;
   in response to determining that the similarity measure exceeds the threshold value, associating the first and second profiles with a same first object that is in the area at the given point in time; and
   aggregating the first profile with the second profile to generate a global profile that represents movement of the first object in the area, the global profile comprising a subset of features from the first profile and the second profile.

2. The system of claim 1, wherein the first and second sensors comprise image sensors, the operations comprising aggregating the first profile and the second profile to generate data that represents movement of the first object in the area.

3. The system of claim 1, wherein the operations further comprise computing a count value indicating how many objects are present in the area at the given point in time based on the global profile.

4. The system of claim 1, wherein the first object is visible by both the first and second sensors.

5. The system of claim 1, wherein the first set of movement attributes includes a time series vector comprising at least one of a timestamp, a motion vector, activity information, color distribution, luminance intensity, or one or more shape measurements comprising an area-to-perimeter ratio.

6. The system of claim 5, wherein the time series vector further includes one or more location coordinates.

7. The system of claim 1, wherein the similarity measure is computed in accordance with an information theoretic metric.

8. The system of claim 1, wherein the first sensor generates the first profile by:
   obtaining an image of the area at the given point in time;
   extracting one or more features from the image of the area; and
   determining a location coordinate, a timestamp, a motion vector, activity information, color distribution, luminance intensity, and one or more shape measurements for one or more objects depicted in the image.

9. The system of claim 1, wherein the operations further comprise:
   determining a first track representing movement of the first object in the area based on the first profile;
   determining a second track representing movement of the first object in the area based on the second profile; and
   fusing the first and second tracks to generate a third track representing movement of the first object in the area.

10. The system of claim 1, wherein the operations further comprise:
    receiving, from the first sensor, a third profile representing a third set of movement attributes detected by the first sensor in the area at the given point in time;
    receiving, from a second sensor, a fourth profile representing a fourth set of movement attributes detected by the second sensor in the area at the given point in time;
    computing a plurality of similarity measures between the first, second, third and fourth profiles; and
    selecting the first and second profiles to be associated with the first object and selecting the third and fourth profiles to be associated with a same second object based on the plurality of similarity measures.

11. The system of claim 1, wherein the operations further comprise estimating linear displacement or angular rotation errors based on the first and second profiles.

12. The system of claim 11, wherein the operations further comprise:
    determining, at a subsequent point in time, that only a single object exists in the area that is visible to the first and second sensors;
    receiving updated first and second profiles representing updated sets of movement attributes within the area at the subsequent point in time from the first and second sensors; and updating the linear displacement or angular rotation errors based on the updated first and second profiles.

13. A method comprising:
receiving, from a first sensor, a first profile representing a first set of movement attributes detected by the first sensor in an area at a given point in time;
receiving, from a second sensor, a second profile representing a second set of movement attributes detected by the second sensor in the area at the given point in time, the first sensor having a first field of view that overlaps a second field of view of the second sensor such that the second sensor detects the second set of movement attributes at a same point in time as the first set of movement attributes are detected by the first sensor;
computing a similarity measure between the first and second sets of movement attributes of the first and second profiles;
determining that the similarity measure exceeds a threshold value; and
in response to determining that the similarity measure exceeds the threshold value, associating the first and second profiles with a same first object that is in the area at the given point in time; and
aggregating the first profile with the second profile to generate a global profile that represents movement of the first object in the area, the global profile comprising a subset of features from the first profile and the second profile.

14. The method of claim 13, wherein the first object is visible by both the first and second sensors.

15. The method of claim 13, wherein the first and second sensors comprise image sensors.

16. The method of claim 13, further comprising estimating linear displacement or angular rotation errors based on the first and second profiles.

17. The method of claim 16, further comprising computing a count value indicating how many objects are present in the area at the given point in time based on the global profile.

18. An apparatus comprising:
means for receiving, from a first sensor, a first profile representing a first set of movement attributes detected by the first sensor in an area at a given point in time;
means for receiving, from a second sensor, a second profile representing a second set of movement attributes detected by the second sensor in the area at the given point in time, the first sensor having a first field of view that overlaps a second field of view of the second sensor such that the second sensor detects the second set of movement attributes at a same point in time as the first set of movement attributes are detected by the first sensor;
means for computing a similarity measure between the first and second sets of movement attributes of the first and second profiles;
means for determining that the similarity measure exceeds a threshold value;
means for, in response to determining that the similarity measure exceeds the threshold value, associating the first and second profiles with a same first object that is in the area at the given point in time; and
means for aggregating the first profile with the second profile to generate a global profile that represents movement of the first object in the area, the global profile comprising a subset of features from the first profile and the second profile.

19. The apparatus of claim 18, further comprising means for estimating linear displacement or angular rotation errors based on the first and second profiles.

20. The apparatus of claim 19, further comprising means for computing a count value indicating how many objects are present in the area at the given point in time based on the global profile.

* * * * *